UNITED STATES PATENT OFFICE.

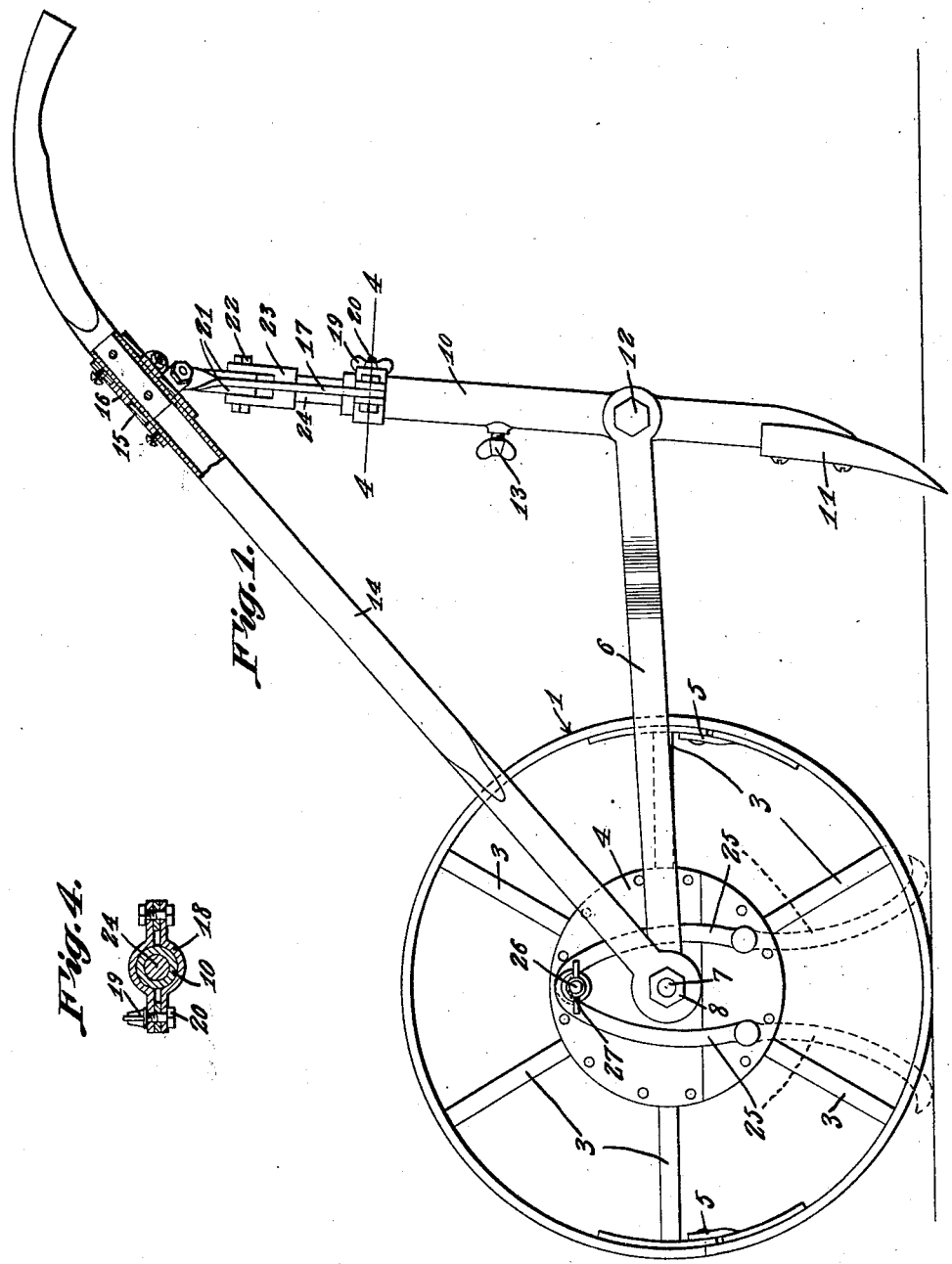

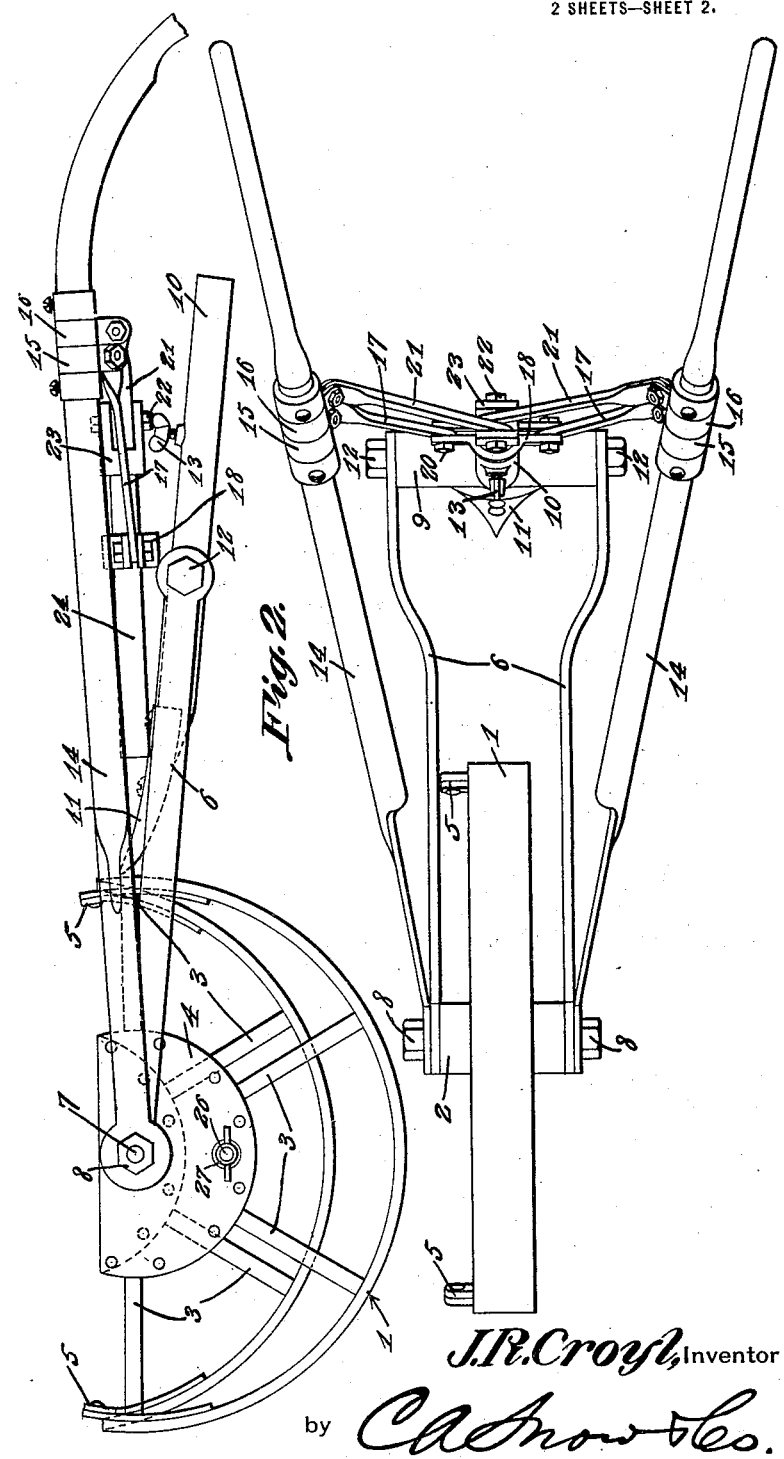

JOSEPH R. CROYL, OF ALTOONA, PENNSYLVANIA.

FOLDING CULTIVATOR.

1,275,401.  Specification of Letters Patent.  Patented Aug. 13, 1918.

Application filed January 25, 1918. Serial No. 213,761.

*To all whom it may concern:*

Be it known that I, JOSEPH R. CROYL, a citizen of the United States, residing at Altoona, in the county of Blair and State of Pennsylvania, have invented a new and useful Folding Cultivator, of which the following is a specification.

The subject of this invention is a folding cultivator, and the objects of the invention are, first, to provide a cultivator which may be stored within a small space and which may be carried to the garden or field, second, to provide means for locking the cultivator parts in operative position, third, to provide means for adjusting the handles, fourth, to provide a simple, durable and efficient cultivator.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

A practical embodiment of the invention is shown in the accompanying drawings, wherein:—

Figure 1 is a side elevation of the cultivator in unfolded position, the wheel locking hooks shown opened in dotted lines;

Fig. 2 is a plan view;

Fig. 3 is a side elevation of the device in folded position;

Fig. 4 is an enlarged detail sectional view taken on the line 4—4 of Fig. 1.

Referring to the drawings by numerals of reference:—

In carrying out the invention a supporting wheel 1 is provided having a hub 2, from which radiate the spokes 3, the inner ends of which spokes are clamped between circular plates 4 which encircle the hub 2 and which are bound together by bolts, rivets or otherwise. The wheel 1 is split or divided to one side of the center and the two parts are connected by hinges 5 which are riveted or otherwise secured to the rim of the wheel and which permit the parts to be folded, the one upon the other.

Supporting links 6 have their ends apertured to receive the ends of the axle 7 of the wheel on which they are held by nuts 8. The rear ends of these links 6 are pivotally secured to a cross arm 9 of a standard 10 to the bottom of which is affixed a plow blade 11. The ends of the links 6 are pivotally secured to the cross arm 9 by means of the nuts 12 or in any other suitable manner. The standard 10 has a central longitudinal bore extending from its upper end throughout a portion of its length, and is drilled transversely and tapped to receive a set screw 13 which may be projected into the central bore.

Handles 14 are pivotally secured to the axle or spindle 7 and are held in place without the links 6 by means of the nuts 8. On these handles are secured collars 15 and 16. To the collars 15 are pivotally secured a pair of links 17, the inner ends of which have pivotal connection with the ends of a clamping strap 18 which is adapted to embrace the upper end of the standard 10 and to be bound thereon by threading the wing nut 19 onto the bolt 20, or in any other suitable manner.

Links 21 are pivotally secured to the collars 16 and their inner ends are pivoted by a bolt 22 or otherwise, to the forked upper end 23 of a rod 24 which rod is adapted to slide into the central bore of the standard 10 and to be clamped therein, when adjusted, by the set screw 13.

For the purpose of locking the wheel in unfolded position, hooks 25 are pivotally secured to one section of the divided center plate 4 and their hooked ends take over a bolt 26 on which is threaded a wing nut 27 for the purpose of binding the hooks in place.

When the device is to be folded, the set screw 13 is loosened or unscrewed to release the rod 24 so that the same may be withdrawn from the bore of the standard. The wing nut 19 is loosened to release the clamping band 18, and the wing nut 27 is loosened to permit the hooks 25 to be swung upon their pivots so as to permit the wheel to be bent upon its hinges. This permits the device to be folded into a very compact article which occupies little space and is easily handled.

The device may be made of any suitable light, yet strong material and may, by preference be made of a standard tubing.

Having thus described the invention, what is claimed as new and sought by Letters Patent, is:—

1. A folding cultivator including a wheel composed of hinged sections, means for locking the sections in extended position, there being a spindle for the wheel, links pivoted to the spindle, a standard pivoted to the links, a cultivator blade on the standard, handles, links pivoted to the handles, means for detachably securing the links to the standard, other links pivotally secured to the handles, and means for adjustably and detachably securing the said links to the standard.

2. A folding cultivator including a wheel composed of hinged sections, means for locking the sections in extended position, handles pivoted to the wheel, a plow standard hung from the handles, and means for adjusting the handles.

3. A folding cultivator including a wheel composed of hinged sections, hooks pivoted to one section, means on the other section for clamping the hooks to hold the sections extended, handles pivoted to the wheel, a plow standard hung from the handles for detachably engaging the standard.

4. A folding cultivator, including a wheel, links pivotally secured to the wheel, a standard having a central longitudinal bore secured to the links, handles, a rod carried by the handles and adapted to enter the bore, and means for clamping the rod in the standard.

In testimony that I claim the foregoing as my own, I have hereto affixed my signature in the presence of two witnesses.

JOSEPH R. CROYL.

Witnesses:
A. R. DILLING,
G. E. MUSSELMAN.

Copies of this patent may be obtained for five cents each, by addressing the "Commissioner of Patents, Washington, D. C."